United States Patent [19]
Schimion

[11] Patent Number: 5,938,935
[45] Date of Patent: Aug. 17, 1999

[54] METHOD AND APPARATUS FOR PURIFYING AND TREATING COOLING AGENTS AND OR LUBRICANTS USED IN THE METALLURGICAL INDUSTRY

[75] Inventor: Werner Schimion, Hilchenbach, Germany

[73] Assignee: SMS Schloemann-Siemag Aktiengesellschaft, Düsseldorf, Germany

[21] Appl. No.: 08/947,583

[22] Filed: Oct. 9, 1997

[30] Foreign Application Priority Data

Oct. 9, 1996 [DE] Germany ............................ 196414652

[51] Int. Cl.$^6$ .................................................. B01D 35/06
[52] U.S. Cl. ...................... 210/695; 210/222; 210/223; 210/324; 210/391; 210/400; 210/521; 210/526
[58] Field of Search ..................... 210/222, 223, 210/695, 294, 324, 400, 391, 526, 521, 396, 416.1

[56] References Cited

U.S. PATENT DOCUMENTS 4,031,011  6/1977  Dorgathen ............................ 210/222
4,115,262  9/1978  Gustavsson et al. .................... 210/223
5,534,155  7/1996  Schimion et al. ...................... 210/695

FOREIGN PATENT DOCUMENTS 4115819  11/1992  Germany.

OTHER PUBLICATIONS

ASEA Journal, 1978, 23rd Year, vol. 1, pp. 15–21, Abwässerreinigungsanlage Magnadisc Für Die Eisenhüttenindustrie.

*Primary Examiner*—David A. Reifsnyder
*Attorney, Agent, or Firm*—Friedrich Kueffner

[57] ABSTRACT

A method and an apparatus for the purification and treatment of liquids which are used for cooling and/or lubricating and contain impurities of metal and other materials, particularly for separating scale from the process water of cooling cycles in the metallurgical industry, wherein the liquid to be purified flows through intermediate spaces between plates arranged parallel next to each other in a container, and wherein the plates are arranged horizontally and are moved upwardly and/or downwardly transversely of the flow direction of the liquid. The solid particles are removed from the process water by sedimentation on the plates and additionally by a magnetic force which emanates from the upper sides of the plates.

9 Claims, 6 Drawing Sheets

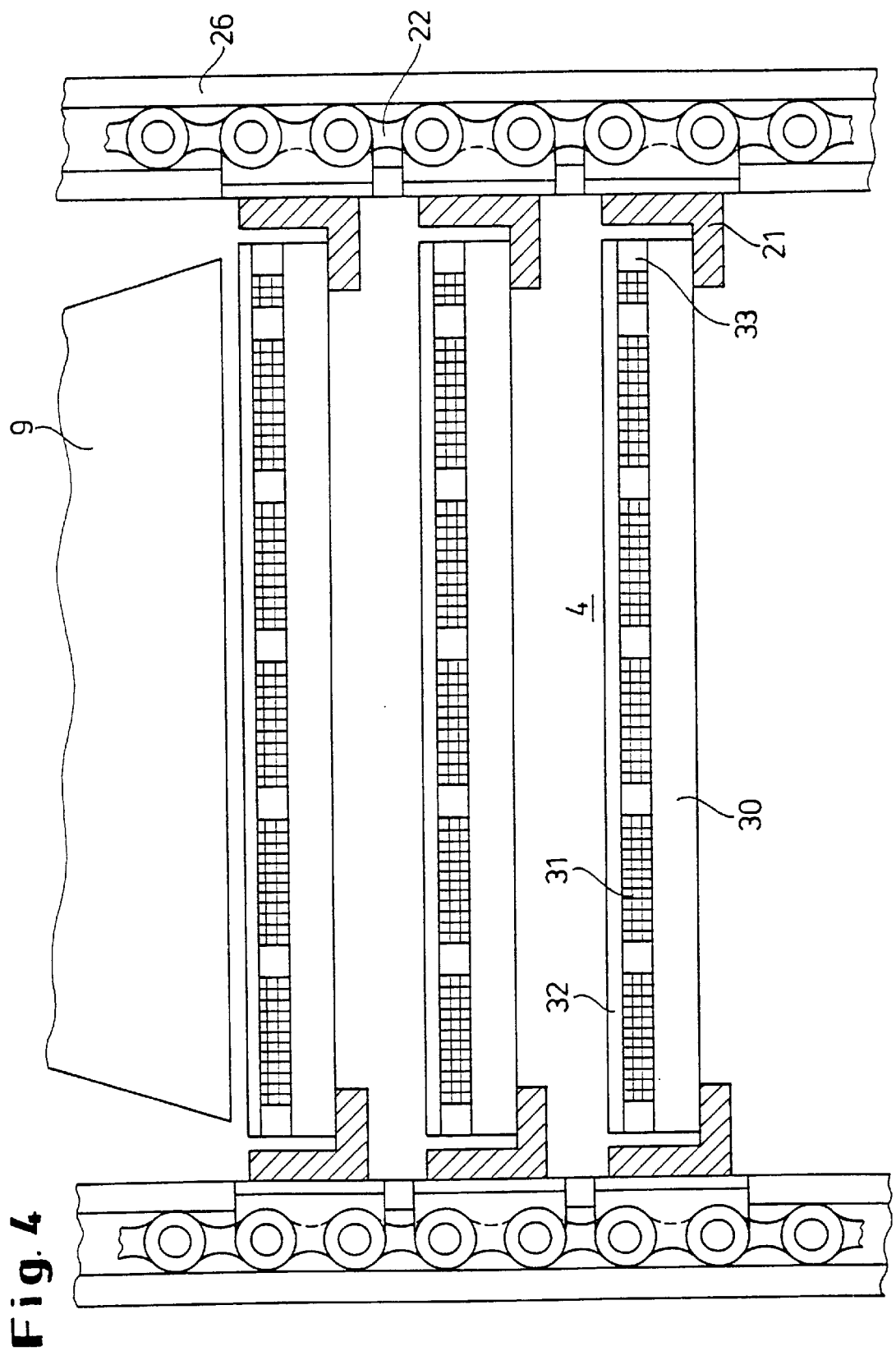

METHOD AND APPARATUS FOR PURIFYING AND TREATING COOLING AGENTS AND OR LUBRICANTS USED IN THE METALLURGICAL INDUSTRY

BACKGROUND OF THE INVENTION

1. Field of the Invention

The present invention relates to a method and an apparatus for the purification and treatment of liquids which are used for cooling and/or lubricating and contain impurities of metal and other materials, particularly for separating scale from the process water of cooling cycles in the metallurgical industry.

2. Description of the Related Art

The metallurgical industry utilizes large quantities of cooling water and lubricants, particularly in continuous casting plants and hot-rolling plants. In addition to scale, the industry produces metal chips and waste from flame cutting and flame chipping. In large blooming trains in hot-rolling mills, the scale is produced in the form of flat cake-like scale or fish scale, while on roller conveyors and cooling beds the scale is produced in the form of small plates or platelets down to grain sizes of a few thousandths of a millimeter. The cooling water supplied to the rolling process is advantageously simultaneously used as a conveying means for the rolling scale and other solids being produced, and for washing away the lubricants, such as oil or grease, which are used. The process water is collected and supplied to a treatment cycle. Particularly problematic for the treatment and purification of the process water has been found to be the fact that the process water with the scale particles becomes mixed with oils and greases which makes it necessary to provide substantial devices for carrying out the treatment and recovery process.

In a conventional plant, the purification and treatment requires a sequence of individual process steps in separate plants, beginning with a coarse purification in a sedimentation basin. In this deep basin, the so-called scale pit, in which the cooling water returning, for example, from a rolling mill is collected, the larger and, thus, heavier scale particles which contain relatively little oil, are separated as a result of sedimentation. The cooling water which has been prepurified in this manner is subsequently pumped into a pretreatment basin in which a further separation of solids is achieved by the use of gravity. For carrying out a subsequent fine purification, the water is pumped through gravel or sand filters and reaches a collecting basin through recooling structures and is then returned to the rolling mill by means of process pumps.

Particularly disadvantageous in this conventional plant are the large space requirement of the plant, the high investment costs and the large amount of energy required for the intermediate pumps.

Another disadvantage is the fact that the work of the pumps causes the leakage oil quantity produced in the rolling mill to adhere to the fine scale which is separated partially in the pretreatment basin and partially in the filters, so that the scale becomes useless and cannot be returned to another metallurgical process. Only the coarse scale which is already separated in the deep basin is still essentially free of oil components and, thus, is suitable for a metallurgical process.

Instead of gravel or sand filters, centrifugal separators are also known in the art for fine purification. In these separators, the liquid and the matter suspended in the liquid enters tangentially and is placed into a circulating movement. Those solids which are heavier than the liquid are forced by the centrifugal force against the wall of the separating chamber and the solids slowly slide downwardly into a collecting chamber. A problem is the fact that the pumping work requires a large amount of energy. Moreover, the effectiveness of this method is limited by the particle sizes; this is because the centrifugal force must increase with decreasing size of the particles and the pumping power and the energy requirement are also increased. In addition, this method of cleaning does not reach the cleaning efficiency which can be achieved by gravel or sand filters.

It is known from DE 41 15 819 A1 to carry out a fine purification by means of a magnetic separator installed in a subsequently arranged pump unit. In accordance with this method, in a zone of the basin of the pump unit which has as little flow as possible, midsized and fine scale particles are separated from the process water by means of the magnetic separator and are stripped above the water level from the magnetic separator. The scale particles obtained in this manner are subsequently returned to the metallurgical process. No details are provided with respect to the type of magnetic separator.

A magnetic filtering plant for waste water purification is disclosed in the ASEA Journal, 1978, 23rd year, Vol. 1, pages 15–21. The proposed purification plant utilizes magnetic disks which are arranged parallel to each other and rotate in a basin which contains the water to be purified. The suspended particles adhere to the disks solely as a result of magnetic force; the particles are stripped from the surfaces of the disks by means of endless profiled rubber belts and are transported out of the filter. However, the endless rubber belts for stripping and removing the sludge are subjected to substantial wear and must be replaced regularly.

In addition to the techniques for the purification of liquids described above, also known in the art is the technique of using parallel plates with inclined lamellae. In accordance with this technique, suspended substances are separated from the liquid by means of gravity sedimentation, wherein the solid particles are deposited on the plates during an upward flow produced in the liquid and slide downwardly into a sludge funnel in a counter-current flow to the upwardly moving clear water. The thin sludge collected in this manner is removed by means of pumps and is further thickened. To ensure that the solid particles slide downwardly, the plates must have an inclination which frequently is 70° relative to the horizontal. However, when the angle of inclination is increased, the efficiency of the separation as a result of sedimentation on the individual plates is reduced. As is the case when separating by means of centrifugal force, this technology does not reach the high degrees of purity as they are achieved when purifying by means of gravel and sand filters. The limit of the separation capability is determined by the density and the size of the solid particles.

SUMMARY OF THE INVENTION

Therefore, it is the primary object of the present invention to provide a method and an apparatus for purifying and treating liquids used for cooling and/or lubricating in which a high degree of purity corresponding to the purification by means of gravel or sand filters is achieved, while the oil content of the removed solids particles is low; simultaneously, the apparatus for carrying out the method should be smaller and less expensive than plants used in the past.

In accordance with the present invention, the liquid to be purified flows through intermediate spaces between plates arranged parallel next to each other in a container, wherein the plates are arranged horizontally and are moved upwardly and/or downwardly transversely of the flow direction of the liquid. The solid particles are removed from the process water by sedimentation on the plates and additionally by a magnetic force which emanates from the upper sides of the plates.

The central aspect of the present invention is to finally purify waters and/or other liquids containing impurities after the coarse purification in only one additional step and to achieve a high degree of purification by simultaneously carrying out a purification and separation of the magnetizable metal particles by the magnetic effect of the respectively upper plate portions, in addition to the separating effect resulting from sedimentation on the plates which are arranged horizontally and parallel one on top of the other and are moved through the liquid bath essentially without changing their angle transversely of the flow direction.

As a result of the magnetic property, preferably permanent-magnetic property, of the respective plate surfaces, the effect of the gravity on the scale particles which are deposited on the plates is multiplied. In contrast, the bottom side of each plate is non-magnetic, so that an oppositely acting magnetic force on the magnetic scale particles does not occur and, thus, the separation produced by the upper sides of the plates is not impaired.

The method and the construction according to the present invention ensure that, on the one hand, the particles are attracted by the upper sides of the plates as a result of magnetic forces and, thus, are removed from the liquid, and, on the other hand, the particles which have been collected on the plates are securely held and no longer can be washed away by the flowing liquid. The upper side of the plate is understood to be the side of the plate which faces in the direction toward the bath level.

A particular advantage compared to conventional plants is the fact that, due to the compacting effect resulting from the magnetic force, oil adhering to the scale particles is released and a scale layer which is low in oil is deposited on the individual plates in this manner. Since the separated scale particles are deposited with only a low oil content, it is ensured that the scale particles can be returned to the metallurgical process and a high percentage of the particles can be reused. In this manner, it is especially possible to save costs for dumping oil-containing residual sludge which is no longer suitable for the metallurgical process; this is particularly desirable for environmental reasons.

The individual plates are moved through the liquid in the form of a stack of plates by means of an endless conveying means. The plates are connected to the conveying means, for example, a transporting chain, through engagement means, such as brackets or angles, provided on each side of the plate. By arranging the plates spaced apart from each other, it is ensured that the water to be purified uniformly flows through the spaces between the plates.

In accordance with a preferred feature, two stacks of plates are arranged one behind the other as seen in flow direction, wherein the plates of one stack are moved upwardly, while the plates of the other stack are moved downwardly. By arranging stacks of plates one behind the other or parallel to each other, it is essentially possible to provide magnetic surfaces of any chosen size depending on the specific requirements.

The plates can be transported continuously or discontinuously. After the respectively uppermost plate of the first stack of plates has been moved out of the liquid bath, the particles deposited on the plate are removed in a simple manner, for example, by suctioning the particles off or by mechanically scraping the particles off. It is advantageous in this connection that when the plate emerges from the liquid bath, the water can already flow off the plate and the particles which are predried in this manner can be easily removed. The suction process can be carried out either with a suction nozzle moved across the respective plate surface or also by means of a stationary nozzle while moving the respectively upper plate. The same is true for mechanical scraping; either a scraper is moved over the stationary plate surface or the plate surface is moved underneath the stationary scraper.

In accordance with a preferred feature, the respectively uppermost plate of the first stack can be pushed after being cleaned into the cycle of the second stack by longitudinally displacing the plate into a compartment of the second stack made available for this purpose, so that this plate participates in the downward movement in the second stack and is again available for purifying the liquid. The engagement means of the transporting means are constructed in such a way that this longitudinal movement of the plates is possible. Analogously, the respectively lowermost plate of the second stack is horizontally displaced in the opposite direction into a compartment of the first stack. In this manner, all plates participate in the purification work of the process water and only the plate located above the bath level for being cleaned is excluded for a short period of time from the purification process.

It is also possible to construct the parallel magnetic plate separator of only one bundle or stack of plates, wherein the individual plates are moved on a continuous full circular path in the liquid bath.

The plates essentially may have any desired shape suitable for transport by means of an endless transporting means.

The upper side of each plate is preferably provided with a magnetic foil which can be glued over the entire surface area thereof onto a magnetizable sheet steel, for example, ferritic sheet steel. This ensures a high efficiency of the magnetic force and makes it simple to prepare the plates for their use.

In accordance with an alternative embodiment, it is recommended to construct the upper side of each plate of individually arranged permanent magnets and a cover plate of non-magnetic or non-magnetizable material, preferably a high-grade steel, wherein the magnetic bodies are connected to the bottom side of the plate, preferably a ferritic sheet steel, by gluing. In accordance with this arrangement, it is ensured that the magnetic field can penetrate the upper side of the plate, i.e., the cover plate in this case, while it cannot penetrate through the bottom side of the plate because the magnetic field is screened in the downward direction. Consequently, particles which can be separated are only attracted and adhere to the upper side of the plate.

It has been found that the glued construction ensures a high total stiffness, so that large separating surfaces can be provided by each plate, while each plate does not bend through significantly even when subjected to a full load of deposited material.

When the parallel magnetic plate separator according to the present invention is used in the cooling water cycle of a rolling mill train, a sedimentation basin for the coarse purification of the process water containing impurities and a line for the pretreated process water are arranged in front of the parallel separator and a unit for discharging and returning the after-treated process water is arranged following the parallel separator. Because the purification effect of the separator according to the present invention is very high, it is not necessary to provide conventional fine purification means, such as gravel and sand filter plants with complicated components.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 4 is a schematic front view, on a larger scale, showing a second embodiment of the support and configuration of the individual horizontally arranged plates of a separator;

DETAILED DESCRIPTION OF THE PREFERRED EMBODIMENTS

Figure 1:
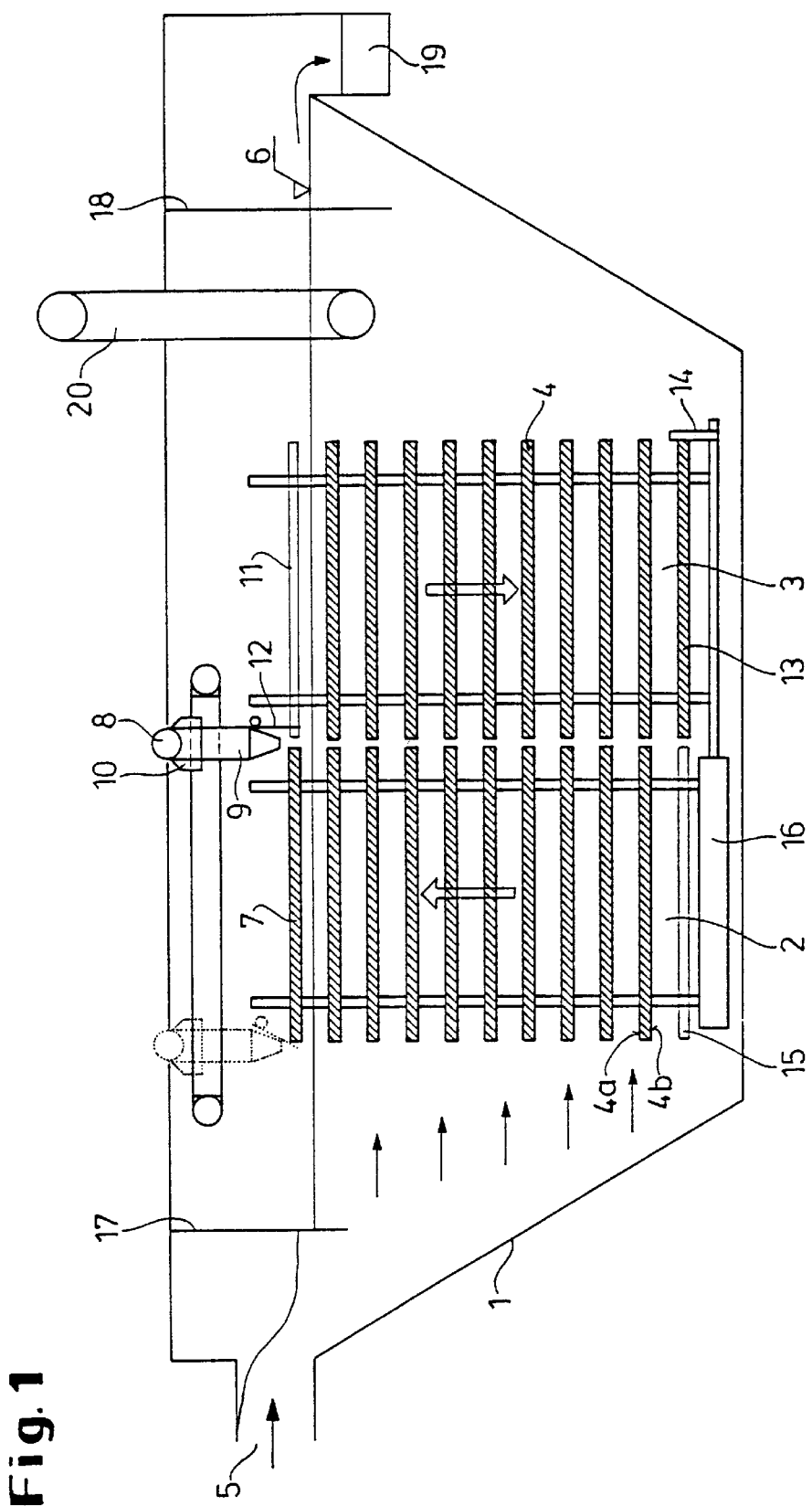
FIG. 1 is a schematic side view, partially in section, showing a parallel magnetic plate separator for the purification of process water containing impurities, with two stacks of plates arranged one behind the other in flow direction.

FIG. 1 of the drawing shows a parallel magnetic plate separator which is composed of two plate stacks 2, 3 arranged one behind the other in a container 1. The two plate stacks 2, 3 are composed of individual horizontally aligned plates 4 which are arranged spaced apart from each other and parallel to each other. While the plates of the first stack 2 are moved upwardly in a stepwise manner, the plates of the second stack 3 are moved downwardly in the direction toward the bottom of the container 1.

The upper portion of the container 1 has at one side thereof a process water inlet 5 through which the water to be purified is introduced into the container 1. The water flows through the spaces between the individual plates 4 transversely of the direction of movement of the plates 4.

The upper sides 4a of the individual plates are provided partially or completely with a magnetic material, while the bottom sides 4b are not magnetic.

The process water which, in addition to undissolved solid particles, particularly scale particles, also contains oils and greases, is purified by means of a sedimentation process due to gravity in combination with the attraction of individual scale particles to the plate surfaces as a result of the magnetic force. The particles deposited and held on the upper surface or side 4b of the plate are transported by each plate transversely of the flow of the liquid in the direction toward the bath level 6. The flow of the liquid cannot wash away the particles because of the magnetic effect of the upper side of the plate.

The respectively uppermost plate of the first stack 2 whose plates are moved upwardly emerges from the liquid bath. Reference numeral 7 denotes such a magnetic plate which is then in the cleaning position. In this cleaning position, a device 8 is provided above the stack 2 for suctioning off the solid particles which have been deposited on the individual plate and which now have emerged from the water and are predried as a result. The device 8 is provided with a suction slot nozzle 9 which by means of a drive 10 is moved parallel and along the plate surface 4a and, thus, ensures a swift and secure suctioning off of the particles.

After the cleaning procedure of the plate in the position 7 has been concluded, the plate 7 is displaced in longitudinal direction into an empty compartment 11 provided for this purpose in the second stack 3, wherein the compartment 11 is on the same level as the plate 7. A catch member 12 is provided for moving or displacing the plate 7. The second stack 3 of plates subsequently moves downwardly by the distance between two plates, wherein the now cleaned plate 7 again enters the liquid flow and once again begins to carry out its purification function. Simultaneously, the lowermost plate 13 of the second plate stack makes contact with a stop 14 for a plate displacement and is moved analogously, but in opposite longitudinal direction, back into an empty compartment 15 of the first stack 2. From there, the plate 13 is once again moved upwardly in a stepwise manner with the stack 2. The displacement of the respectively lowermost plate 13 is effected by means of a hydraulic cylinder 16 which is provided with the stop 14 at its piston rod.

In order to protect the suctioning device 8 and the respectively uppermost plate 7 against unnecessary splashes due to the process water flowing into the container, a submerged wall or baffle 17 is arranged in that area of the container 1. A second submerged wall or baffle 18 is provided at the outlet side closely in front of the outlet 19 of the now purified water from the container 1.

As already mentioned, the magnetic plates make it possible to essentially completely remove the oil from the scale particles to which the oil adheres. After the liquid has flowed through the upwardly and downwardly moving plate stacks 2, 3, the liquid is freed of undissolved solid particles. The separated oil is removed closely in front of the outlet 19 by means of an oil separator or oil skimmer 20 on the liquid level.

Figure 2:
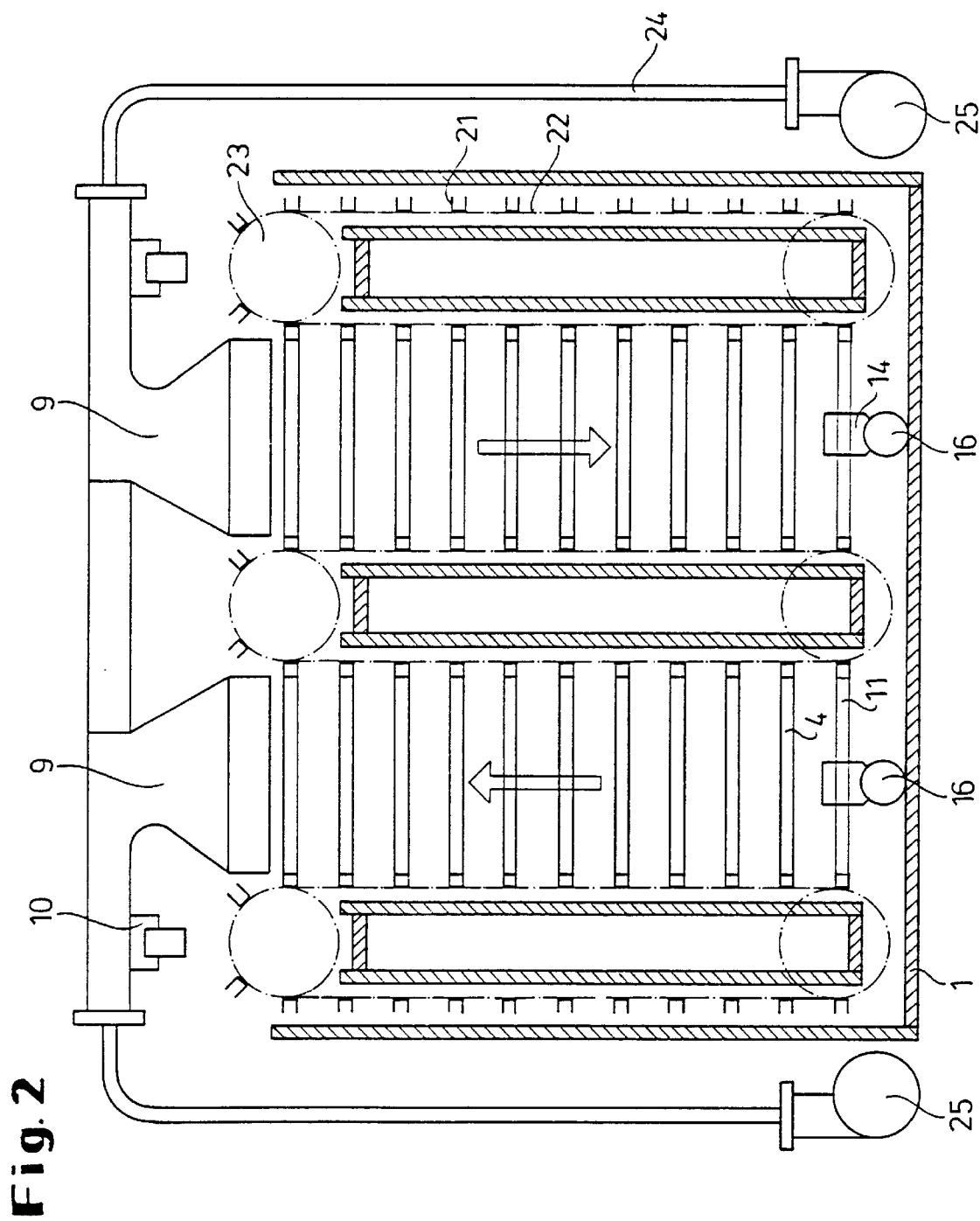
FIG. 2 is a schematic front view of the separator of FIG. 1.

FIG. 2 of the drawing once again shows in detail the transporting technology of the individual plate stacks and the suctioning technology. The individual plates are received on both sides and transported by suitable angles or brackets 21 which are moved by means of an endless conveyor chain 22 about two chain wheels 23. In this embodiment, the cross-section of the separator can be widened in a simple manner by adding additional plate stacks; this can be done without problems if the container has the appropriate size. A suctioning nozzle 9 is provided for each plate stack for cleaning the respectively uppermost magnetic plate which has emerged from the liquid; through suction connections 24 which are connected to suction fans 25, the particles removed from the flow are suctioned off and transported into suitable containers for being reused in the metallurgical process. This conveying technology makes it possible to adapt the parallel magnetic plate separator individually to the degree of contamination of the respective process water by selecting the appropriate number of plates. If a suitable amount of support angles or brackets are provided, plates can be easily removed or added.

Figure 3:
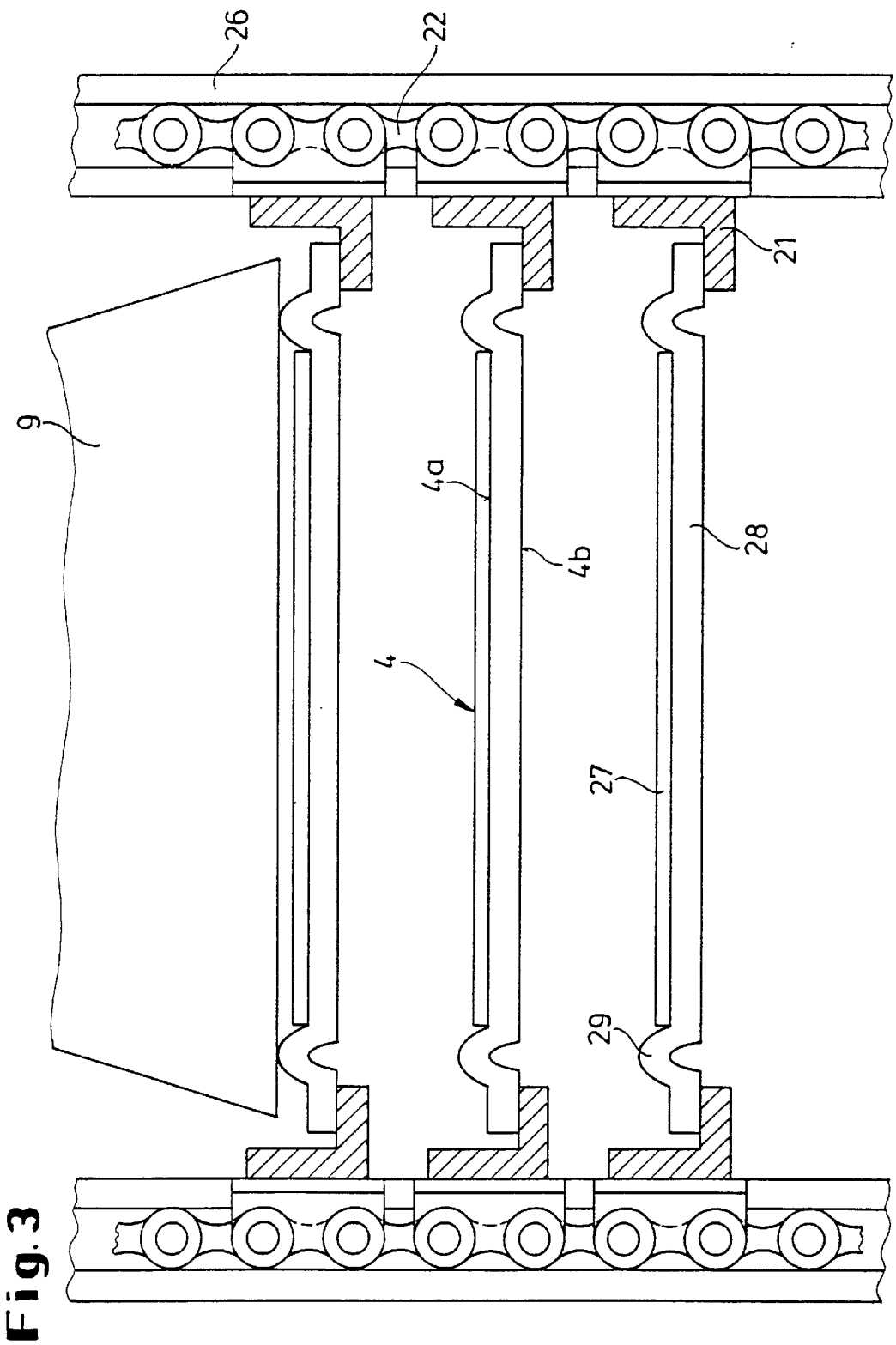
FIG. 3 is a schematic front view, on a larger scale, showing a first embodiment of the support and configuration of the individual horizontally arranged plates of a separator.

FIGS. 3 and 4 show in detail how the individual plates rest on the receiving angles or supports 21. The conveyor chain 22 moves in a chain guide 26. The receiving angles 21 are attached through lugs to the conveyor chain 22.

In the embodiment of FIG. 3, the plates 4 are composed of a magnetic foil 27 and a carrier sheet 28 which, in this embodiment, preferably is of ferritic steel. The magnetic foil 27 is glued over its entire surface area to the upper side of the steel sheet. The nozzle 9 of the suctioning device 8 is illustrated schematically. The uppermost plate is in the cleaning position. The surface is cleaned by suctioning off by means of the slot-type nozzle which is moved across the length of the plate. The plates 4 have border reinforcements 29 in the form of undulations which simultaneously insure that the individual plates are being held at a predetermined distance relative to the suctioning nozzle 9. This ensures that the surface of the magnetic foil does not come into contact with the suctioning nozzle which would result in wear of the foil.

Figure 5A:
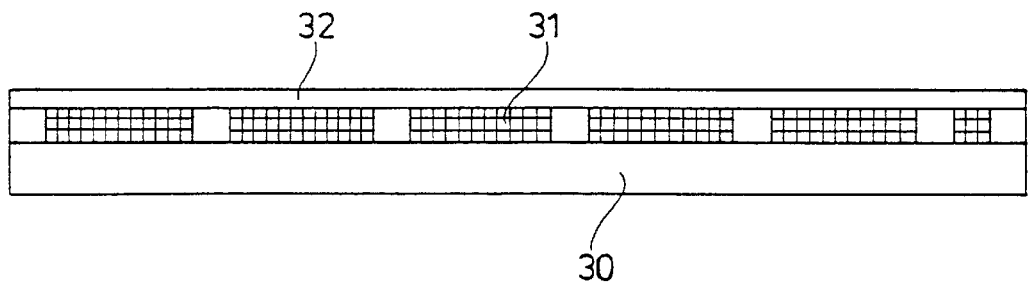
FIGS. 5a and 5b are a side view and a top view, respectively, of a detail of the embodiment of FIG. 4.
Figure 5B:
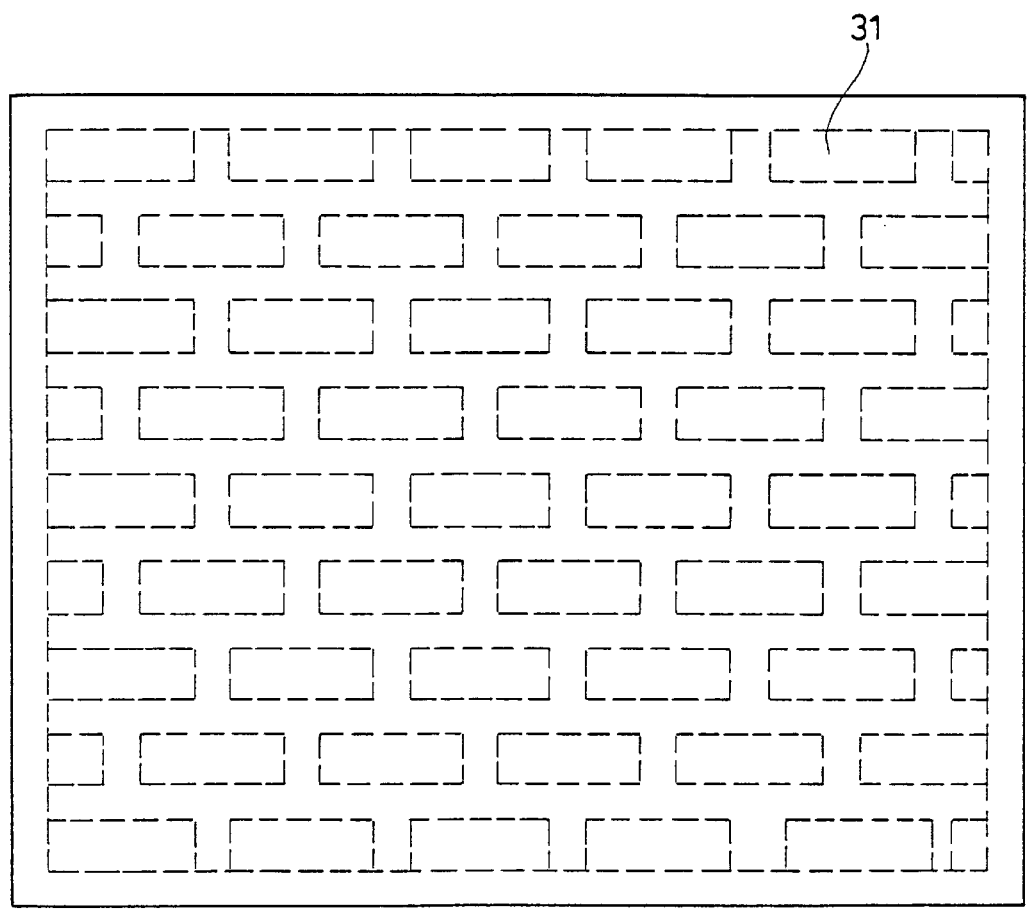

FIG. 4 of the drawing shows another embodiment of the magnetic plate. Each magnetic plate 4 is composed of a lower carrier plate 30, wherein rectangular permanent magnets 31 are placed on the carrier plate 30 and a cover plate 32 of a non-magnetic material, preferably an austenitic high-grade steel, is placed on the permanent magnets 31. Reference numeral 33 denotes a circumferential border ledge. The individual permanent magnets 31 are arranged offset relative to each other, as shown in FIG. 5b, and are glued onto the carrier plate 30. FIG. 5a shows in a side view, partially in section, the magnetic plate described above which is composed of the carrier plate 30, permanent magnets 31 and the cover plate 32.

Figure 6:
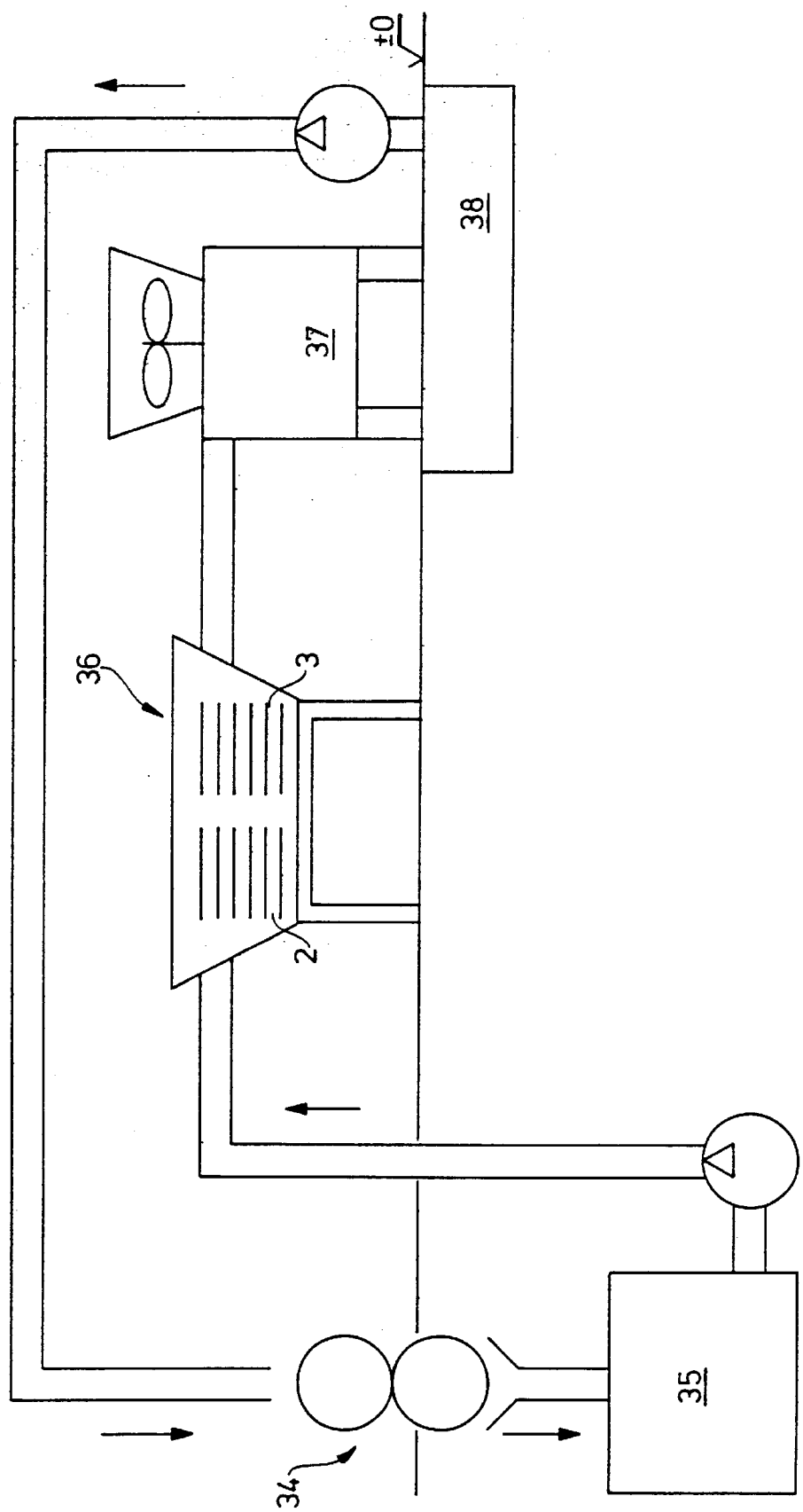
FIG. 6 is a schematic view of a parallel magnetic plate separator according to the present invention integrated in a closed cooling water cycle of a roll stand.

FIG. 6 of the drawing schematically illustrates the simple layout of a completely closed circulating cooling water system with an integrated parallel magnetic plate separator as used, for example, in a rolling train. The cooling water used for the rolling train 34 symbolically identified by two rolls is collected and supplied to a scale pit 35 for the coarse removal of the larger scale particles by sedimentation. The coarse sinter deposited in this manner is removed in the conventional manner by means of a grab-type crane. The water prepurified in this manner is pumped into the parallel magnetic plate separator 36 which, in the illustrated embodiment, is composed of two plate stacks 2, 3, the water flows without pressure loss through the stacks 2 and 3 while being cleaned as a result of the simultaneous fine purification using gravity and magnetic force and the water flows as purified water into the subsequently arranged recooling plant 37. The purified and cooled water is collected in the cold water basin 38 underneath the recooling plant 37 and is subsequently again available through process pumps to the rolling train.

The present invention can be utilized particularly advantageously in the water treatment plants of, for example, CSP-mills or hot-rolling mills.

The invention is not limited by the embodiments described above which are presented as examples only but can be modified in various ways within the scope of protection defined by the appended patent claims.

I claim:

1. A method of purifying and treating liquids used for cooling and/or lubricating and containing impurities of metal and other materials, the method comprising conducting the liquid to be purified in a container through intermediate spaces between plates arranged horizontally and parallel to each other in the container, moving the plates at least one of upwardly and downwardly transversely of a flow direction of the liquid, and removing solid particles from the liquid by sedimentation on the plates and additionally by a magnetic force of attraction, wherein upper sides of the plates are magnetic in order to generate the magnetic force.

2. The method according to claim 1, comprising using an endless conveyor means for moving the plates, wherein the plates are connected through engagement means to the endless conveyor means.

3. The method according to claim 1, wherein the plates are moved in at least two stacks, wherein a first of the stacks moves the plates upwardly and a second of the stacks moves the plates downwardly, further comprising moving an uppermost plate of the first stack above a liquid level and removing particles collected on the uppermost plate, and moving the uppermost plate horizontally after the particles have been removed into an uppermost open position of the second stack, and horizontally moving a lowermost plate of the second stack into an open position of the first stack.

4. An apparatus for cleaning and treating liquids used for cooling and/or lubricating and containing impurities of metal and other materials, the apparatus comprising a plurality of plates extending horizontally and parallel to each other in a container containing the liquid to be purified and treated, the container being configured to allow the liquid to flow from an inlet in a flow direction toward an outlet, further comprising means for moving the plates one of upwardly and downwardly, each plate having an upper side and a lower side, the upper side of each plate being at least partially magnetic and the lower side of each plate being non-magnetic, whereby solid particles contained in the liquid are removed from the liquid by sedimentation on the plates and additionally by a magnetic force of attraction produced by the upper sides of the plates, and removing the solid particles collected on the plates.

5. The apparatus according to claim 4, wherein the upper side of each plate is permanent magnetic.

6. The apparatus according to claim 4, wherein a magnetic foil is mounted on the upper side of each plate.

7. The apparatus according to claim 4, comprising a plurality of individual magnetic bodies on the upper side of each plate and a cover plate of non-magnetic material placed on the magnetic bodies.

8. The apparatus according to claim 4, wherein the means for moving the plates upwardly and downwardly are comprised of endless conveyor means forming at least two stacks, wherein the plates are moved upwardly in a first of the stacks and the plates are moved downwardly in a second of the stacks, and wherein the stacks are arranged in flow direction of the liquid one behind the other.

9. The apparatus according to claim 4, comprising upstream of the separator a sedimentation basin for process water and devices for removing coarse scale from the liquid, and means for conducting the liquid from the sedimentation basin and the devices for removing coarse scale to the container, further comprising means downstream of the separator for conducting and returning the purified liquid to a metallurgical process.

* * * * *